(12) United States Patent
Hamano

(10) Patent No.: US 9,680,511 B1
(45) Date of Patent: Jun. 13, 2017

(54) DISTORTION COMPENSATOR, DISTORTION COMPENSATION METHOD AND RADIO EQUIPMENT

(71) Applicant: FUJITSU LIMITED, Kawasaki-shi, Kanagawa (JP)

(72) Inventor: Mitsuharu Hamano, Sendai (JP)

(73) Assignee: FUJITSU LIMTIED, Kawasaki (JP)

( * ) Notice: Subject to any disclaimer, the term of this patent is extended or adjusted under 35 U.S.C. 154(b) by 0 days.

(21) Appl. No.: 15/362,310

(22) Filed: Nov. 28, 2016

(30) Foreign Application Priority Data

Mar. 2, 2016 (JP) ................................. 2016-040241

(51) Int. Cl.
*H04B 1/04* (2006.01)
(52) U.S. Cl.
CPC ... *H04B 1/0475* (2013.01); *H04B 2001/0425* (2013.01); *H04B 2001/0433* (2013.01)
(58) Field of Classification Search
CPC .. H03F 1/3247; H03F 2201/3233; H03F 3/24; H03F 1/3294; H03F 2200/336; H03F 1/3258; H03F 2201/3227; H03F 2200/451; H03F 3/189; H03F 1/3241; H03F 2201/3231; H03F 1/3282; H03F 2200/204; H03F 2200/207; H03F 2200/321
USPC ...................................................... 455/114.3
See application file for complete search history.

(56) References Cited

U.S. PATENT DOCUMENTS

| 2005/0258898 A1* | 11/2005 | Hongo | .................. | H03F 1/3241 330/149 |
| 2014/0347132 A1* | 11/2014 | Kawasaki | ................. | H03F 3/21 330/291 |
| 2015/0028947 A1* | 1/2015 | Lozhkin | .................. | H03F 3/189 330/149 |

FOREIGN PATENT DOCUMENTS

| JP | 05-175743 | 7/1993 |
| JP | 2006-033205 | 2/2006 |
| JP | 2006-121408 | 5/2006 |
| JP | 2006-270638 | 10/2006 |

* cited by examiner

*Primary Examiner* — Ajibola Akinyemi
(74) *Attorney, Agent, or Firm* — Fujitsu Patent Center

(57) ABSTRACT

A distortion compensator, includes: an input terminal configured to receive a transmission signal; a processor configured to perform operations to process the transmission signal, wherein the operations includes: compensating a nonlinear distortion of an amplifier which amplifies a power of the transmission signal, by using a distortion compensation coefficient corresponding to an amplitude value of the transmission signal; calculating a difference between a power value of the transmission signal and a power value of a feedback signal from the amplifier; calculating an imaginary part of a first complex vector based on an error between the transmission signal and the feedback signal in a cartesian coordinate system; and updating the distortion compensation coefficient by using a second complex vector of which a real part is the difference, and an imaginary part is the imaginary part of the first complex vector.

12 Claims, 6 Drawing Sheets

DISTORTION COMPENSATOR, DISTORTION COMPENSATION METHOD AND RADIO EQUIPMENT

CROSS-REFERENCE TO RELATED APPLICATION

This application is based upon and claims the benefit of priority of the prior Japanese Patent Application No. 2016-040241, filed on Mar. 2, 2016, the entire contents of which are incorporated herein by reference.

FIELD

The embodiments discussed herein are related to a distortion compensator, a distortion compensation method and a radio equipment.

BACKGROUND

A radio equipment such as a base station and a user terminal in a radio communication system includes a power amplifier (hereinafter, sometimes referred to as "PA") for amplifying a power of a transmission signal. In such radio equipment, the PA is operated near a saturation region of the PA in order to increase the power efficiency of the PA. However, when the PA is operated near the saturation region, a nonlinear distortion increases. Thus, in order to reduce an adjacent channel leakage power (ACP) by suppressing the nonlinear distortion in the PA, the radio equipment is provided with a distortion compensator that compensates the nonlinear distortion in the PA.

Related technologies are disclosed in, for example, Japanese Laid-Open Patent Publication Nos. 2006-121408 and 2006-270638.

SUMMARY

According to one aspect of the embodiments, a distortion compensator, includes: an input terminal configured to receive a transmission signal; a processor configured to perform operations to process the transmission signal, wherein the operations includes: compensating a nonlinear distortion of an amplifier which amplifies a power of the transmission signal, by using a distortion compensation coefficient corresponding to an amplitude value of the transmission signal; calculating a difference between a power value of the transmission signal and a power value of a feedback signal from the amplifier; calculating an imaginary part of a first complex vector based on an error between the transmission signal and the feedback signal in a cartesian coordinate system; and updating the distortion compensation coefficient by using a second complex vector of which a real part is the difference, and an imaginary part is the imaginary part of the first complex vector.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

A "pre-distortion (hereinafter, sometimes referred to as "PD") scheme" is one of distortion compensation schemes used in a distortion compensator. A distortion compensator employing the PD scheme suppresses a distortion occurring in an output signal of a PA, by increasing the linearity of the output signal of the PA by pre-multiplying a transmission signal before being input to the PA by a distortion compensation coefficient having the reverse characteristic of a nonlinear distortion in the PA. As a result of the multiplication of the transmission signal by the distortion compensation coefficient, both a distortion of an amplitude component of the transmission signal and a distortion of a phase component of the transmission signal are compensated. Hereinafter, a signal obtained by multiplying the transmission signal by the distortion compensation coefficient may be referred to as a "pre-distortion signal (PD signal)." Therefore, the PD signal is a signal pre-distorted before being input to the PA due to the reverse characteristic of the nonlinear distortion in the PA. In addition, hereinafter, the distortion of the amplitude component of the transmission signal in the PA may be referred to as an "amplitude distortion," and the distortion of the phase component of the transmission signal in the PA may be referred to as a "phase distortion."

For example, a distortion compensator employing the PD scheme may have a lookup table storing a plurality of distortion compensation coefficients (hereinafter, sometimes referred to as a "distortion compensation table"). The distortion compensator having the distortion compensation table reads, from the distortion compensation table, a distortion compensation coefficient corresponding to an amplitude value of a transmission signal input to the distortion compensator and multiplies the transmission signal by the read distortion compensation coefficient. The distortion compensation coefficients stored in the distortion compensation table are sequentially updated such that an error between a transmission signal as a reference signal and a signal output from the PA and fed back to a distortion compensation part (hereinafter, sometimes referred to as a "feedback signal") becomes minimal. An error between the transmission signal and the feedback signal is represented by a complex vector coupling the transmission signal and the feedback signal in Cartesian coordinates. The method of representing an error between the transmission signal and the feedback signal by a complex vector coupling the transmission signal and the feedback signal in the Cartesian coordinates will be referred to as a "Cartesian coordinate approach."

Figure 1A:
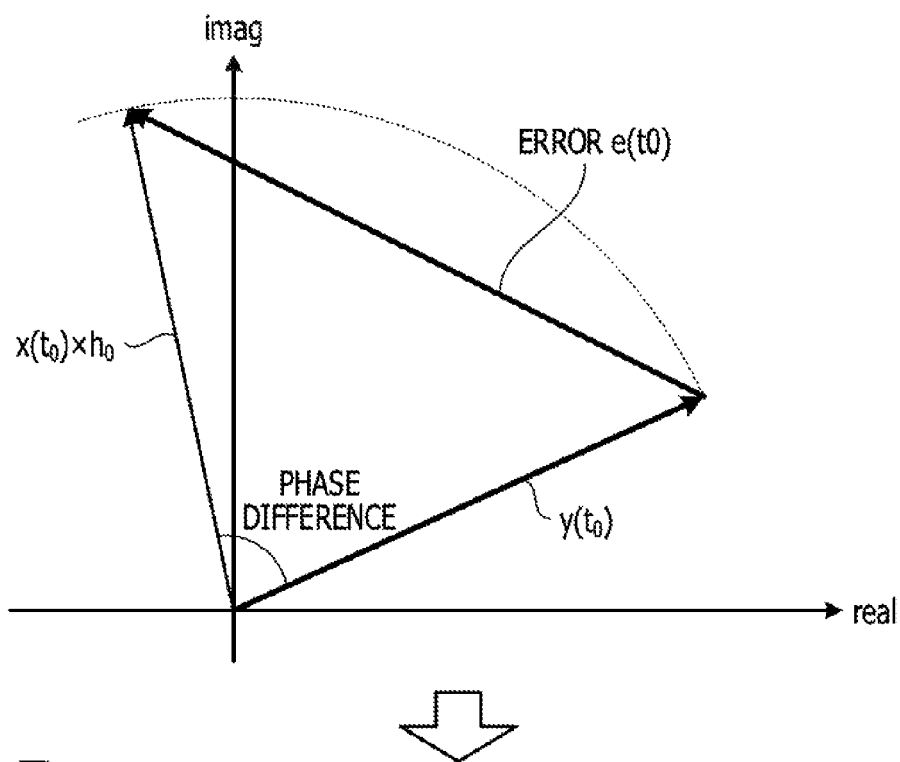
FIGS. 1A and 1B are an example of a relationship between an error e(t) between a transmission signal x(t) and a feedback signal y(t) and an amplitude deviation of the feedback signal y(t)
Figure 1B:
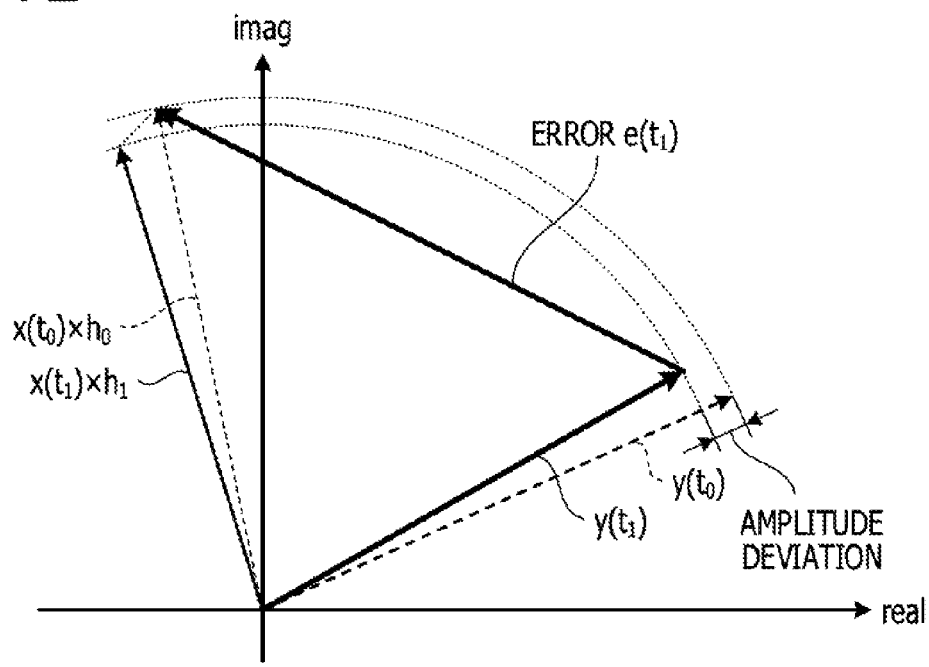

FIGS. 1A and 1B are an example of a relationship between an error e(t) between a transmission signal x(t) and a feedback signal y(t) and an amplitude deviation of the feedback signal y(t). FIG. 1A represents a state where no amplitude difference is present between a transmission signal x(t0) and a feedback signal y(t0) at time t0, and only a phase difference is present between the transmission signal x(t0) and the feedback signal y(t0). For example, as illustrated in FIG. 1A, the error e(t0) between the transmission signal x(t0) and the feedback signal y(t0) is represented by a complex vector coupling a transmission signal and a feedback signal in the Cartesian coordinates. At time t1 after the time t0, a distortion compensation coefficient h0 is updated to a distortion compensation coefficient h1 such that an error e(t1) becomes smaller than the error e(t0). Then, as illustrated in FIG. 1B, the amplitude of a feedback signal y(t1) becomes smaller than the amplitude of the feedback signal y(t0), which results in an amplitude deviation of the feedback signal y(t). Such an amplitude deviation of the feedback signal y(t) leads to an amplitude difference between the transmission signal x(t) and the feedback signal y(t), which did not exist originally. This amplitude difference increases with the increase in the phase difference between the transmission signal x(t0) and the feedback signal y(t0). In addition, the above-mentioned "amplitude distortion" also increases with the increase in the amplitude difference, thereby deteriorating the distortion compensation performance.

As described above, there is a possibility of the deterioration of the distortion compensation performance in the Cartesian coordinate approach.

Thus, it may be conceivable to employ an approach of representing an error between a transmission signal and a feedback signal by the polar coordinates (hereinafter, sometimes referred to as a "polar coordinate approach"). In the polar coordinate approach, since the error between the transmission signal and the feedback signal is represented by an amplitude and a phase, the problem of the increase in the "amplitude distortion" may be is avoided and the distortion compensation performance may be improved.

However, the polar coordinate approach increases the circuit scale since it performs an operation of converting the Cartesian coordinates into the polar coordinates and an operation of returning the polar coordinates to the Cartesian coordinates.

Hereinafter, embodiments of the distortion compensator and the distortion compensation method of the present disclosure will be described in detail with reference to the drawings. The present disclosure is not limited by the embodiments. In addition, elements having the same as or similar to function will be denoted by the same reference numeral, and overlapping descriptions thereof will be omitted or reduced.

EMBODIMENTS (Exemplary Configuration of Radio Equipment)

Figure 2:
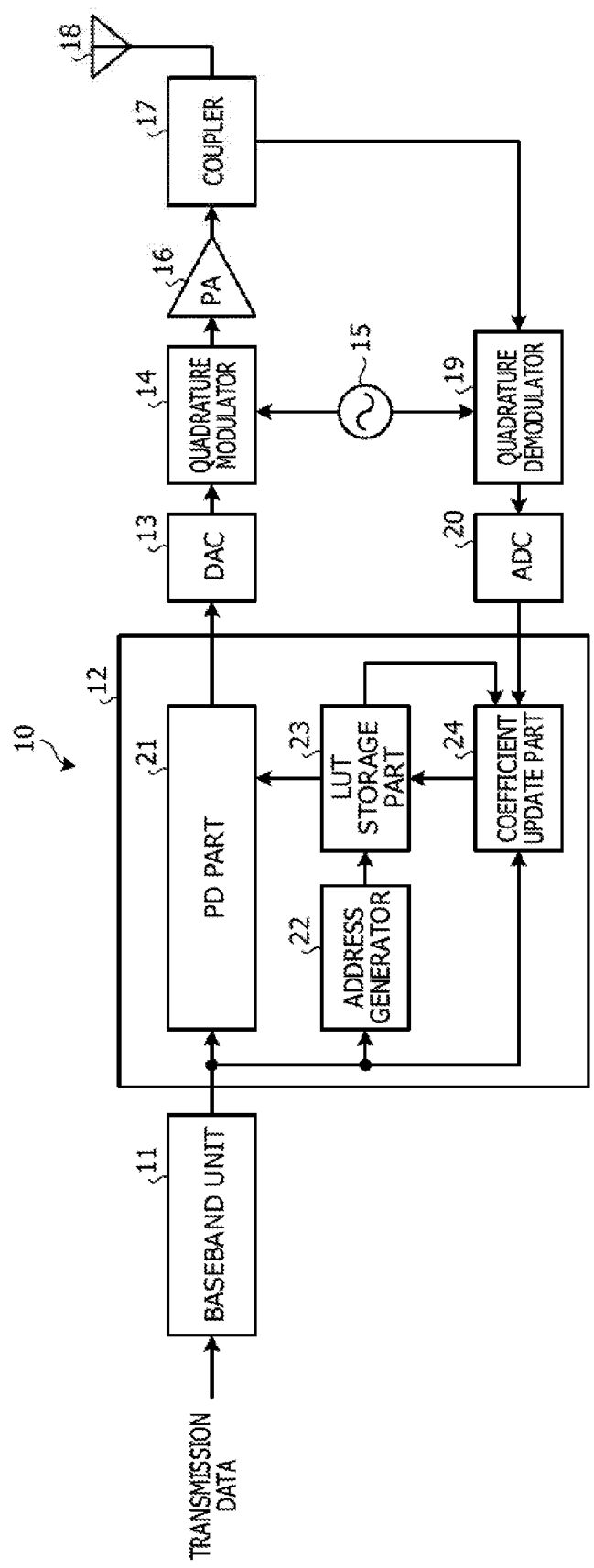
FIG. 2 is a block diagram illustrating an example of radio equipment according to an embodiment.

FIG. 2 is a block diagram illustrating an example of radio equipment according to an embodiment. In FIG. 2, radio equipment 10 includes a baseband unit 11, a distortion compensator 12, a digital-analog converter (DAC) 13, a quadrature modulator 14, a carrier generator 15, a PA 16, a coupler 17, and an antenna 18. Further, the ratio equipment 10 includes a quadrature demodulator 19 and an analog-digital converter (ADC) 20. The distortion compensator 12 includes a pre-distortion (PD) part 21, an address generator 22, a lookup table (LUT) storage part 23, and a coefficient update part 24.

The baseband unit 11 generates a transmission signal of a baseband by subjecting input transmission data to baseband processings such as coding and modulation, and outputs the generated transmission signal to the PD part 21, the address generator 22, and the coefficient update part 24. The transmission signal generated by the baseband unit 11 includes an in-phase component signal (I signal) and a quadrature component signal (Q signal).

The PD part 21 generates a PD signal having the reverse characteristic that cancels the distortion characteristic of the PA 16, by multiplying the I signal and the Q signal of the transmission signal by a real part and an imaginary part of a distortion compensation coefficient output from the LUT storage part 23, respectively, and outputs the generated PD signal to the DAC 13. For example, the PD part 21 compensates the nonlinear distortion of the PA 16 using a distortion compensation coefficient.

The DAC 13 converts the PD signal corresponding to each of the I signal and the Q signal from a digital signal to an analog signal which is then output to the quadrature modulator 14.

The carrier generator 15 generates a reference carrier and outputs the generated reference carrier to the quadrature modulator 14 and the quadrature demodulator 19.

The quadrature modulator 14 multiplies the I signal of the PD signal by the reference carrier and multiplies the Q signal of the PD signal by a carrier obtained by phase-shifting the reference carrier by 90°. Then, the quadrature modulator 14 performs quadrature modulation and up-conversion for the PD signal by adding the two multiplication results, and outputs the quadrature modulated and up-converted PD signal to the PA 16.

The PA 16 amplifies the power of the PD signal input from the quadrature modulator 14 and outputs the power-amplified PD signal to the coupler 17.

The coupler 17 distributes the power-amplified PD signal to the antenna 18 and the quadrature demodulator 19. Thus, the signal output from the PA 16 is fed back to the distortion compensator 12 via the quadrature demodulator 19 and the ADC 20.

The antenna 18 transmits the power-amplified PD signal.

The quadrature demodulator 19 performs a down-conversion and quadrature demodulation for the signal input from the coupler 17 by multiplying the signal by each of the reference carrier generated in the carrier generator 15 and the carrier obtained by phase-shifting the reference carrier by 90°. Then, the quadrature demodulator 19 outputs a feedback signal obtained by the quadrature demodulation to the ADC 20. The feedback signal obtained by the quadrature demodulation includes an I signal and a Q signal.

The ADC 20 converts the feedback signal from an analog signal into a digital signal which is then output to the coefficient update part 24.

The address generator 22 obtains a power p of a transmission signal x(t) input from the baseband unit 11, generates an address corresponding to the obtained power p, and designates the generated address for the LUT storage part 23.

The LUT storage part 23 holds a distortion compensation table LUT. The LUT stores a plurality of addresses and a plurality of distortion compensation coefficients corresponding to the plurality of addresses, respectively. For example, the LUT storage part 23 uses the LUT to store the distortion compensation coefficients for cancelling the nonlinear distortion of the PA 16 in address positions corresponding to discrete powers p of the transmission signal x(t), respectively. Each of the distortion compensation coefficients stored in the LUT includes an amplitude component coefficient and a phase component coefficient. The LUT storage part 23 outputs a distortion compensation coefficient corresponding to the address designated by the address generator 22 to the PD part 21 and the coefficient update part 24.

The coefficient update part 24 calculates a difference between the power of the transmission signal input from the baseband unit 11 and the power of the feedback signal input from the ADC 20 (hereinafter, sometimes simply referred as a "difference"). Then, the coefficient update part 24 calculates an "imaginary part of a first complex vector" based on an error between the transmission signal and the feedback signal in the Cartesian coordinate system. Then, the coefficient update part 24 updates the distortion compensation coefficients stored in the LUT of the LUT storage part 23 using a "second complex vector" of which a real part is the "difference" and an imaginary part is the "imaginary part of the first complex vector."

Figure 3:
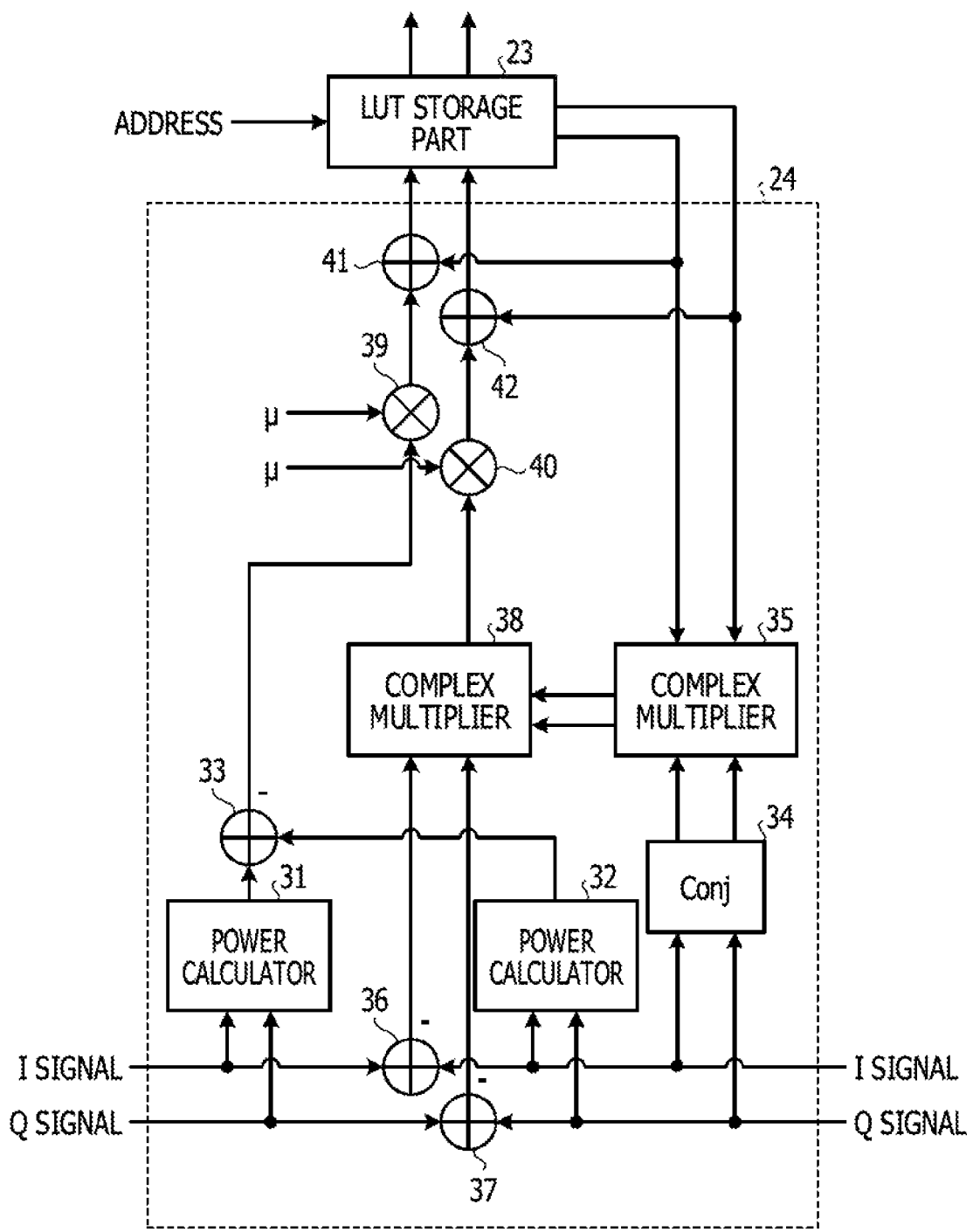
FIG. 3 is a view illustrating an example of a coefficient update part of the embodiment.

For example, as illustrated in FIG. 3, the coefficient update part 24 includes a power calculator 31, a power calculator 32, a subtractor 33, a conjugate complex signal output part (Conj) 34, and a complex multiplier 35. Further, as illustrated in FIG. 3, the coefficient update part 24 includes subtractors 36 and 37, a complex multiplier 38, multipliers 39 and 40, and adders 41 and 42. FIG. 3 is a view illustrating an example of the coefficient update part of the present embodiment.

The power calculator 31 calculates a power value $|x(t)|^2$ ($=x_{re}(t)^2+x_{im}(t)^2$) of the transmission signal x(t) input from the baseband unit 11 and outputs the calculated power value $|x(t)|^2$ to the subtractor 33. Here, $x_{re}(t)$ represents a real part of the transmission signal x(t) and corresponds to the I signal of the transmission signal x(t). In addition, $x_{im}(t)$ represents an imaginary part of the transmission signal x(t) and corresponds to the Q signal of the transmission signal x(t).

The power calculator 32 calculates a power value $|y(t)|^2$ ($=y_{re}(t)^2+y_{im}(t)^2$) of the feedback signal y(t) input from the baseband unit 11 and outputs the calculated power value $|y(t)|^2$ to the subtractor 33. Here, $y_{re}(t)$ represents a real part of the feedback signal y(t) and corresponds to the I signal of the feedback signal y(t). In addition, $y_{im}(t)$ represents an imaginary part of the feedback signal y(t) and corresponds to the Q signal of the feedback signal y(t).

The subtractor 33 calculates a difference ($|x(t)|^2-|y(t)|^2$) between the power value $|x(t)|^2$ input from the power calculator 31 and the power value $|y(t)|^2$ input from the power calculator 32 and outputs the calculated difference to the multiplier 39.

The conjugate complex output part 34 outputs a conjugate complex signal y*(t) of the feedback signal y(t) to the complex multiplier 35.

The complex multiplier 35 performs a complex multiplication of a distortion compensation coefficient $h_{n-1}(p)$ and the conjugate complex signal y*(t) to obtain a complex multiplication result rot(t) ($=h_{n-1}(p)y^*(t)$).

The subtractors 36 and 37 calculate an error e(t) between the transmission signal x(t) and the feedback signal y(t) in the Cartesian coordinate system and output the calculated error e(t) to the complex multiplier 38. That is, the subtractor 36 outputs a difference ($x_{re}(t)-y_{re}(t)$) between the I signal $x_{re}(t)$ of the transmission signal x(t) and the I signal $y_{re}(t)$ of the feedback signal y(t) as a real part of the error e(t). The subtractor 37 outputs a difference ($x_{im}(t)-y_{im}(t)$) between the Q signal $x_{im}(t)$ of the transmission signal x(t) and the Q signal $y_{im}(t)$ of the feedback signal y(t) as an imaginary part of the error e(t).

The complex multiplier 38 calculates only an imaginary part of a complex multiplication result e(t)rot(t) of the error e(t) output from the subtractors 36 and 37 and the complex multiplication result rot(t) obtained by the complex multiplier 35, and outputs the calculated imaginary part to the multiplier 40. The complex multiplication result e(t)rot(t) is an example of the "first complex vector," and the imaginary part of the complex multiplication result e(t)rot(t) is an example of the "imaginary part of the first complex vector." The imaginary part of the complex multiplication result e(t)rot(t) is expressed by $(x_{re}(t)-y_{re}(t))rot_{im}(t)+(x_{im}(t)-y_{im}(t))rot_{re}(t)$. Here, $rot_{re}(t)$ is a real part of the complex multiplication result rot(t), and $rot_{im}(t)$ is an imaginary part of the complex multiplication result rot(t).

Figure 4:
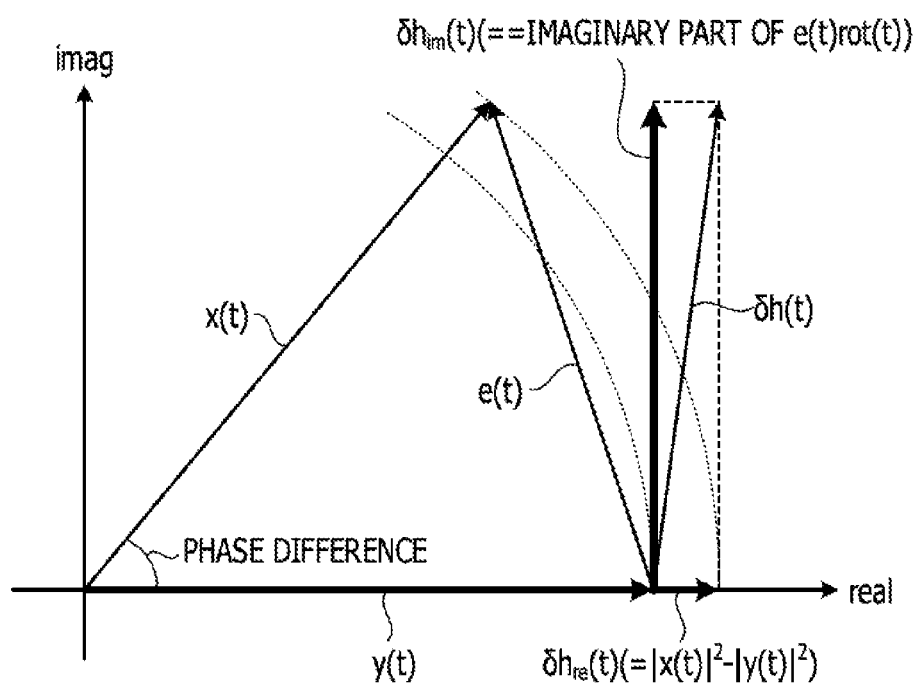
FIG. 4 is a view provided for explaining a second complex vector of the embodiment.

Here, the difference ($|x(t)|^2-|y(t)|^2$) calculated by the subtractor 33 and the imaginary part of the complex multiplication result e(t)rot(t) calculated by the complex multiplier 38 form the "second complex vector" δh(t). FIG. 4 is a view provided for explaining the second complex vector of the present embodiment. As illustrated in FIG. 4, the "second complex vector" δh(t) is a complex vector of which a real part $δh_{re}(t)$ is the difference ($|x(t)|^2-|y(t)|^2$) and an imaginary part $δh_{im}(t)$ is the imaginary part of the complex multiplication result e(t)rot(t). The real part $δh_{re}(t)$ of the "second complex vector" δh(t) is irrelevant to a phase difference between the transmission signal x(t) and the feedback signal y(t). For this reason, even when the phase difference between the transmission signal x(t) and the feedback signal y(t) increases, the increase of the "amplitude distortion" in the Cartesian coordinate approach as described above with respect to FIG. 1 may be avoided. As a result, a lowering of the distortion compensation accuracy may be reduced.

Referring back to FIG. 3, the multiplier 39 multiplies a step size parameter μ and the difference ($|x(t)|^2-|y(t)|^2$) (for example, the real part $δh_{re}(t)$ of the "second complex vector" δh(t)) calculated by the subtractor 33. The multiplier 40 multiplies the step size parameter μ and the imaginary part of the complex multiplication result e(t)rot(t) (for example, the imaginary part $δh_{im}(t)$ of the "second complex vector" δh(t)) calculated by the complex multiplier 38.

The adder 41 adds an output $μ(|x(t)|^2-|y(t)|^2)$ of the multiplier 39 and a real part of the distortion compensation coefficient $h_{n-1}(p)$ to calculate a real part of a new distortion compensation coefficient $h_n(p)$. The adder 42 adds an output $μ\{(x_{re}(t)-y_{re}(t))rot_{im}(t)+(x_{im}(t)-y_{im}(t))rot_{re}(t)\}$ of the multiplier 40 and an imaginary part of the distortion compensation coefficient $h_{n-1}(p)$ to calculate an imaginary part of the new distortion compensation coefficient $h_n(p)$. Thus, the new distortion compensation coefficient $h_n(p)$ is calculated. The coefficient update part 24 updates the distortion compensation coefficient stored in the LUT of the LUT storage part 23 to the new distortion compensation coefficient $h_n(p)$.

With the above-described configuration, the coefficient update part 24 performs the following calculation process.

$$h_n(p)=h_{n-1}(p)+μδh(t)$$

$$δh(t)=δh_{re}(t)+jδh_{im}(t)$$

$$δh_{re}(t)=|x(t)|^2-|y(t)|^2$$

$$=x_{re}(t)^2+x_{im}(t)^2-(y_{re}(t)^2+y_{im}(t)^2)$$

$$δh_{im}(t)=(x_{re}(t)-y_{re}(t))rot_{im}(t)+(x_{im}(t)-y_{im}(t))rot_{re}(t)$$

$$e(t)=x(t)-y(t)$$

$$=x_{re}(t)-y_{re}(t)+j(x_{im}(t)-y_{im}(t))$$

$$rot(t)=h_{n-1}(p)y^*(t)$$

$$p=|x(t)|^2$$

Here, each of x, y, f, h, u, and e is a complex number, and * is a conjugate complex number. The coefficient update part 24 repeats this calculation process to update the distortion compensation coefficient $h_n(p)$ such that the magnitude of the "second complex vector" $\delta h(t)$ becomes minimal.

(Exemplary Operation of Distortion Compensator)

Figure 5:
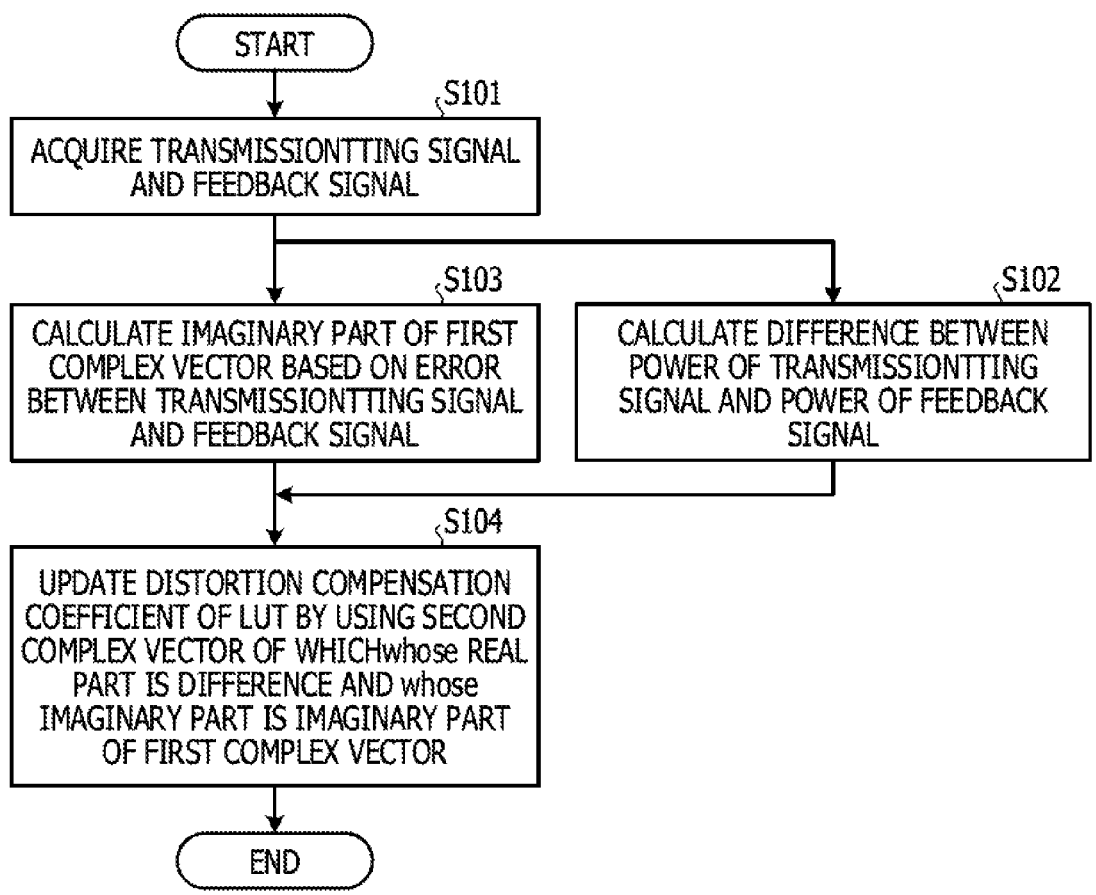
FIG. 5 is a flow chart illustrating an example of a processing operation of a distortion compensator of the embodiment.

An example of the processing operation of the distortion compensator 12 included in the above-configured radio equipment 10 will be described. FIG. 5 is a flow chart illustrating an exemplary processing operation of the distortion compensator of the present embodiment.

As illustrated in FIG. 5, the coefficient update part 24 of the distortion compensator 12 acquires a transmission signal input from the baseband unit 11 and a feedback signal input from the ADC 20 (Operation S101).

The coefficient update part 24 calculates a "difference" between a power of the transmission signal and a power of the feedback signal (Operation S102).

The coefficient update part 24 calculates an "imaginary part of a first complex vector" based on an error between the transmission signal and the feedback signal in the Cartesian coordinate system (Operation S103).

The coefficient update part 24 updates a distortion compensation coefficient stored in the LUT of the LUT storage part 23, by using a "second complex vector" of which a real part is the "difference" and an imaginary part is the "imaginary part of the first complex vector" (Operation S104). Then, the PD part 21 generates a PD signal having the reverse characteristic that cancels the distortion characteristic of the PA 16, by multiplying an I signal and a Q signal of the transmission signal by a real part and an imaginary part of the distortion compensation coefficient updated by the coefficient update part 24, respectively, and outputs the generated PD signal to the DAC 13.

Figure 6:
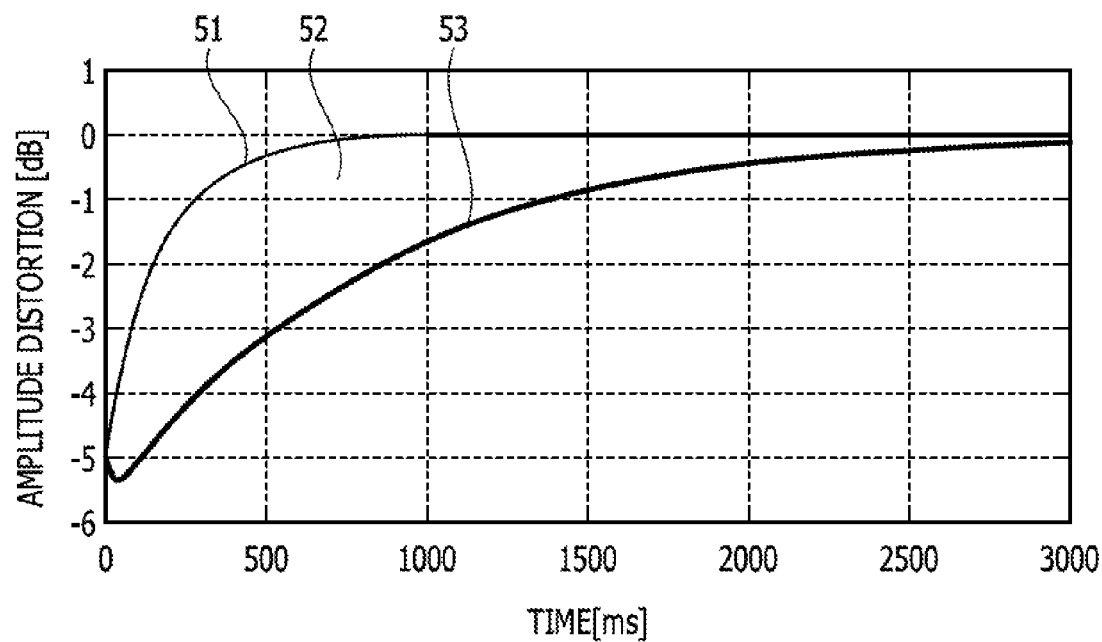
FIG. 6 is an example of simulation result.

FIG. 6 is an example of simulation result. FIG. 6 represents a simulation result for an example of a temporal variation of the "amplitude distortion" in a PA when a phase difference is present between the transmission signal and the feedback signal. In FIG. 6, a curve 51 indicates a temporal variation of the "amplitude distortion" in a PA when a distortion compensator employing a polar coordinate approach is used. A curve 52 indicates a temporal variation of the "amplitude distortion" in the PA 16 when the distortion compensator 12 of the present embodiment is used. A curve 53 indicates a temporal variation of the "amplitude distortion" in a PA when a distortion compensator employing the Cartesian coordinate approach is used.

As represented in FIG. 6, in the distortion compensator employing the Cartesian coordinate approach, time from the initiation of the simulation until the "amplitude distortion" in the PA converged at 0 was about 3,000 ms. This time did not meet the pre-allowed specification.

In contrast, in the distortion compensator 12 of the present embodiment, the time from the initiation of the simulation until the "amplitude distortion" in the PA 16 converged at 0 was about 2,000 ms. This time did meet the pre-allowed specification. For example, in the distortion compensator 12 of the present embodiment, the distortion compensation performance has been improved, as compared to the distortion compensator employing the Cartesian coordinate approach.

According to the above-described embodiment, in the distortion compensator 12, the coefficient update part 24 calculates the "difference" between the power of the transmission signal and the power of the feedback signal. Then, the coefficient update part 24 calculates the "imaginary part of the first complex vector" based on the error between the transmission signal and the feedback signal in the Cartesian coordinate system. Then, the coefficient update part 24 updates the distortion compensation coefficient stored in the LUT of the LUT storage part 23, by using the "second complex vector" of which a real part is the "difference" and an imaginary part is the "imaginary part of the first complex vector."

With the configuration of the distortion compensator 12, the distortion compensation coefficient may be updated by using the "second complex vector" of which the real part is irrelevant to the phase difference between the transmission signal and the feedback signal. Therefore, even when the phase difference between the transmission signal and the feedback signal increases, since the distortion compensation coefficient may approach to a proper value, the increase of the "amplitude distortion" in the PA 16 may be avoided. In addition, since the distortion compensator 12 does not perform the operation of converting the Cartesian coordinates into the polar coordinates and the operation of returning the polar coordinates to the Cartesian coordinates, an amount the computation may be reduced, as compared to the distortion compensator employing the "polar coordinate system." As a result, according to the present embodiment, the distortion compensation performance may be improved while suppressing the increase of the circuit scale.

In addition, in the distortion compensator 12, the coefficient update part 24 updates the distortion compensation coefficient stored in the LUT of the LUT storage part 23 such that the magnitude of the "second complex vector" becomes minimal.

With the configuration of the distortion compensator 12, even when the phase difference between the transmitting signal and the feedback signal increases, since the distortion compensation coefficient may quickly approach to a proper value, the increase of the "amplitude distortion" in the PA 16 may be avoided more stably.

OTHER EMBODIMENTS

The distortion compensator 12 is implemented with hardware such as a field programmable gate array (FPGA), a large scale integrated (LSI) circuit, or a processor. The baseband unit 11 is also implemented with hardware such as a FPGA, an LSI, or a processor. An example of the processor may be a central processing unit (CPU), a digital signal processor (DSP) or the like. In addition, the DAC 13, the quadrature modulator 14, the carrier generator 15, the PA 16, the coupler 17, the antenna 18, the quadrature demodulator 19, and the ADC 20 are implemented with hardware such as radio communication modules. In addition, the radio equipment 10 and the distortion compensator 12 may include a memory. For example, the memory stores a table in which distortion compensation coefficients are stored.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A distortion compensator, comprising:
an input terminal configured to receive a transmission signal;
a processor configured to perform operations to process the transmission signal,
wherein the operations includes:
compensating a nonlinear distortion of an amplifier which amplifies a power of the transmission signal, by using a distortion compensation coefficient corresponding to an amplitude value of the transmission signal;
calculating a difference between a power value of the transmission signal and a power value of a feedback signal from the amplifier;
calculating an imaginary part of a first complex vector based on an error between the transmission signal and the feedback signal in a cartesian coordinate system; and
updating the distortion compensation coefficient by using a second complex vector of which a real part is the difference, and an imaginary part is the imaginary part of the first complex vector.

2. The distortion compensator according to claim 1, wherein the distortion compensation coefficient is updated such that a magnitude of the second complex vector becomes minimal.

3. The distortion compensator according to claim 1, wherein the distortion compensation coefficient is stored a table, and the distortion compensation coefficient stored in the table is updated.

4. The distortion compensator according to claim 3, wherein the tables stores the distortion compensation coefficient for cancelling the nonlinear distortion of the amplifier in an address position corresponding to each discrete power of the transmission signal.

5. A distortion compensation method, comprising:
compensating, by a computer, a nonlinear distortion of an amplifier which amplifies a power of a transmission signal, by using a distortion compensation coefficient held in a distortion compensation table and corresponding to an amplitude value of the transmission signal; and
calculating a difference between a power value of the transmission signal and a power value of a feedback signal from the amplifier;
calculating an imaginary part of a first complex vector based on an error between the transmission signal and the feedback signal in a cartesian coordinate system; and
updating the distortion compensation coefficient stored in the distortion compensation table by using a second complex vector of which a real part is the difference, and an imaginary part is the imaginary part of the first complex vector.

6. The distortion compensation method according to claim 5, wherein the distortion compensation coefficient is updated such that a magnitude of the second complex vector becomes minimal.

7. The distortion compensation method according to claim 5, wherein the distortion compensation coefficient is stored a table, and the distortion compensation coefficient stored in the table is updated.

8. The distortion compensation method according to claim 7, wherein the tables stores the distortion compensation coefficient for cancelling the nonlinear distortion of the amplifier in an address position corresponding to each discrete power of the transmission signal.

9. A radio equipment, comprising:
an amplifier configured to amplify a power of a transmission signal; and
a distortion compensator configured to:
compensate a nonlinear distortion of the amplifier by using a distortion compensation coefficient corresponding to an amplitude value of the transmission signal;
calculate a difference between a power value of the transmission signal and a power value of a feedback signal from the amplifier;
calculate an imaginary part of a first complex vector based on an error between the transmission signal and the feedback signal in a cartesian coordinate system; and
update the distortion compensation coefficient by using a second complex vector of which a real part is the difference, and an imaginary part is the imaginary part of the first complex vector.

10. The radio equipment according to claim 9, wherein the distortion compensation coefficient is updated such that a magnitude of the second complex vector becomes minimal.

11. The radio equipment according to claim 9, wherein the distortion compensation coefficient is stored a table in the distortion compensator, and the distortion compensation coefficient stored in the table is updated.

12. The radio equipment according to claim 11, wherein the tables stores the distortion compensation coefficient for cancelling the nonlinear distortion of the amplifier in an address position corresponding to each discrete power of the transmission signal.

* * * * *